(12) United States Patent
Gabrys et al.

(10) Patent No.: US 11,520,865 B2
(45) Date of Patent: Dec. 6, 2022

(54) METHOD FOR SWAPPING ADJACENT INSTRUCTIONS MIDSTREAM IN SOFTWARE EXECUTABLES IN ORDER TO HIDE INFORMATION THEREIN

(71) Applicant: United States Government as represented by the Secretary of the Navy, San Diego, CA (US)

(72) Inventors: Ryan C. Gabrys, San Diego, CA (US); Luis M. Martinez, San Diego, CA (US); Sunny James Fugate, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 200 days.

(21) Appl. No.: 17/165,660

(22) Filed: Feb. 2, 2021

(65) Prior Publication Data
US 2022/0245221 A1    Aug. 4, 2022

(51) Int. Cl.
*G06F 21/00* (2013.01)
*H04L 29/06* (2006.01)
(Continued)

(52) U.S. Cl.
CPC .............. *G06F 21/12* (2013.01); *G06F 21/44* (2013.01); *H04L 9/0869* (2013.01);
(Continued)

(58) Field of Classification Search
CPC ....... G06F 21/12; G06F 21/44; H04L 9/0869; H04L 9/0894; H04L 9/3247
See application file for complete search history.

(56) References Cited

U.S. PATENT DOCUMENTS 8,732,674 B1 *  5/2014  Agha .................. G06F 9/45516
                                                       717/168
11,243,816 B2 *  2/2022  Goossens ................ G06F 9/505

OTHER PUBLICATIONS

Shterenberg et al.; Analysis of Using Equivalent Instructions at the Hidden Embedding of Information into the Executable Files; Journal of Theoretical and Applied Information Technology, vol. 80 No.1; Oct. 10, 2015.

(Continued)

*Primary Examiner* — Philip J Chea
*Assistant Examiner* — Rodman Alexander Mahmoudi
(74) *Attorney, Agent, or Firm* — Naval Information Warfare Center, Pacific; Kyle Eppele; J. Eric Anderson

(57) ABSTRACT

A method for hiding information in executable code comprising: identifying a set of pairs of interchangeable instructions, wherein each pair has an instruction order of execution that is reversible without changing a functionality of the executable code; organizing the pairs into a plurality of matrices based on a set of random seeds; for each matrix, inverting a submatrix consisting of a subset of columns from each matrix to identify a subset of pairs; identifying a matrix that has full column rank on a subset of columns that is a function of the pairs' location; storing an index of the identified matrix's associated seed in a secure data storage location; and encoding data into the executable code by reversing the order of execution of the subset of pairs and treating each pair having reversed instructions as a "1" and each pair of non-reversed instructions as a "0" or vice versa.

14 Claims, 3 Drawing Sheets

(51) Int. Cl.
   *G06F 21/12* (2013.01)
   *G06F 21/44* (2013.01)
   *H04L 9/08* (2006.01)
   *H04L 9/32* (2006.01)

(52) U.S. Cl.
   CPC .......... *H04L 9/0894* (2013.01); *H04L 9/3247* (2013.01); *G06F 2221/0748* (2013.01)

(56) References Cited

OTHER PUBLICATIONS

Ryan Gabrys and Luis Martinez; A Change Would Do You Good: GA-Based Approach for Hiding Data in Program Executables; GECCO'19, Prague, Czech Republic, Jul. 13-17, 2019.

Rakan El-Khalil and Angelos D. Keromystis; Hydan: Hiding Information in Program Binaries; Lopez J., Qing S., Okamoto E. (eds) Information and Communications Security. ICICS 2004. Lecture Notes in Computer Science, vol. 3269. Springer, Berlin, Heidelberg. 2004.

Blasco et al.; Steganalysis of Hydan. IFIP Advances in Information and Communication Technology, 297, pp. 132-142; 2009.

O. Elishco, R. Gabrys, M. Medard and E. Yaakobi, "Repeat-Free Codes," 2019 IEEE International Symposium on Information Theory (ISIT), Paris, France; 2019.

B. Anckaert et al., "Steganography for executables and code transformation signatures," ICISS 2011.

J. Fridrich & D. Soukal; "Matrix embedding for large payloads," in IEEE Transactions on Information Forensics and Security, vol. 1, No. 3, pp. 390-395, 2006.

* cited by examiner

Example Executable Code

```
Foo:
    movl $0xFF01122, %eax
    addl %ecx, %edx
    xordl %esi, %esi
    pushl %ebx
    movl 4(%esp), %ebx
    leal (%eax, %ecx, 2), %esi
```

12 →
14 { addl %ecx, %edx ; xordl %esi, %esi (pair)
16 { movl ... ; addl ... } and { movl 4(%esp) ; leal ... }

*Fig. 2A*

Executable Code with Some Adjacent Instructions Swapped

```
Foo:
    addl %ecx, %edx
    movl $0xFF01122, %eax
    xordl %esi, %esi
    pushl %ebx
    leal (%eax, %ecx, 2), %esi
    movl 4(%esp), %ebx
```

*Fig. 2B*

METHOD FOR SWAPPING ADJACENT INSTRUCTIONS MIDSTREAM IN SOFTWARE EXECUTABLES IN ORDER TO HIDE INFORMATION THEREIN

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, Calif., 92152; voice (619) 553-5118; ssc_pac_t2@navy.mil. Reference Navy Case Number 112157.

BACKGROUND OF THE INVENTION

In a computing context, steganography is the practice of concealing data (e.g., message, file, program, etc.) within another file, message, image, program, or video. In order to embed data into program executables, previous efforts have attempted to switch between semantically equivalent instructions. However, previous approaches suffered from drawbacks such as being easily discoverable. There is a need for an improved method of hiding information in executable code.

SUMMARY

Disclosed herein in a method for using a computer to hide information in executable code comprising the following steps. The first step provides for identifying in the executable code a set of pairs of interchangeable assembly-level instructions. Each pair of instructions has an order of execution of its constituent instructions that is reversible without changing a functionality or performance of the executable code. The next step provides for organizing the pairs of interchangeable assembly-level instructions into a plurality of random matrices based on a set of random seeds. Each seed maps to exactly one matrix. Then, for each random matrix, the next step provides for inverting a submatrix consisting of a subset of columns from each matrix to identify a subset of pairs of interchangeable instructions. The next step provides for identifying a matrix from the plurality of matrices that has full column rank on a subset of columns that is a function of the location of each of the pairs of interchangeable instructions and then storing an index of the identified matrix's associated seed in a secure data storage location. The next step provides for encoding binary information into the executable code by reversing the order of execution of the subset of pairs of interchangeable instructions and treating each pair having reversed instructions as a "1" and each pair of interchangeable instructions having an original order of execution as a "0" or vice versa.

An embodiment of the method for using a computer to hide information in executable code is also described herein as comprising the following steps. The first step (a) in this embodiment provides for identifying in the executable code a set J of pairs of interchangeable assembly-level instructions. The next step (b) provides for generating a |J|×n matrix M over a finite field of size two based on one of a set S of random seeds. The variable n is a total number of interchangeable assembly-level instructions. The next step (c) provides for creating a sub-matrix $M_J$ composed of a subset of columns of the matrix M indexed by the set J to identify a subset of pairs of interchangeable instructions. The next step (d) provides for repeating steps (b) and (c) with different seeds until the sub-matrix $M_J$ has full rank. The next step (e) provides for encoding hidden binary information into the executable code by reversing the order of execution of the subset of the pairs of interchangeable assembly-level instructions. Each pair of the subset of pairs with a reversed order of execution is deemed a "1" and each pair of assembly-level instructions that maintains an original order of execution is deemed a "0" such that the functionality of the executable code is not altered. The next step (f) provides for storing in a secure location an index of a seed associated with the full-rank sub-matrix $M_J$. The next step (g) provides for retrieving the hidden binary information by recovering the index of the seed associated with the full-rank sub-matrix $M_J$ from the secure location and regenerating the matrix M based on the seed associated with the full-rank sub-matrix $M_J$.

Another embodiment of the method for using a computer to hide information in executable code is also described herein as comprising the following steps. The first step provides for embedding a message into the executable code by swapping an order of execution of a subset of a set of interchangeable, assembly-level instructions. The next step provides for storing meta-data in a secure location which can be used to recover the embedded message. Another step provides for representing locations of which instructions are swapped as binary vectors whose length is equal to a number of instructions in the program. Each position in the vector corresponds to an instruction in the program.

BRIEF DESCRIPTION OF THE DRAWINGS

Throughout the several views, like elements are referenced using like references. The elements in the figures are not drawn to scale and some dimensions are exaggerated for clarity.

FIGS. 2A and 2B depict examples of executable code.

DETAILED DESCRIPTION OF EMBODIMENTS

The disclosed method below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

References in the present disclosure to "one embodiment," "an embodiment," or any variation thereof, means that a particular element, feature, structure, or characteristic described in connection with the embodiments is included in at least one embodiment. The appearances of the phrases "in one embodiment," "in some embodiments," and "in other embodiments" in various places in the present disclosure are not necessarily all referring to the same embodiment or the same set of embodiments.

As used herein, the terms "comprises," "comprising," "includes," "including," "has," "having," or any variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of words such as "the," "a," or "an" are employed to describe elements and components of the embodiments herein; this is done merely for grammatical reasons and to conform to idiomatic English. This detailed description should be read to include one or at least one, and the singular also includes the plural unless it is clearly indicated otherwise.

Figure 1:
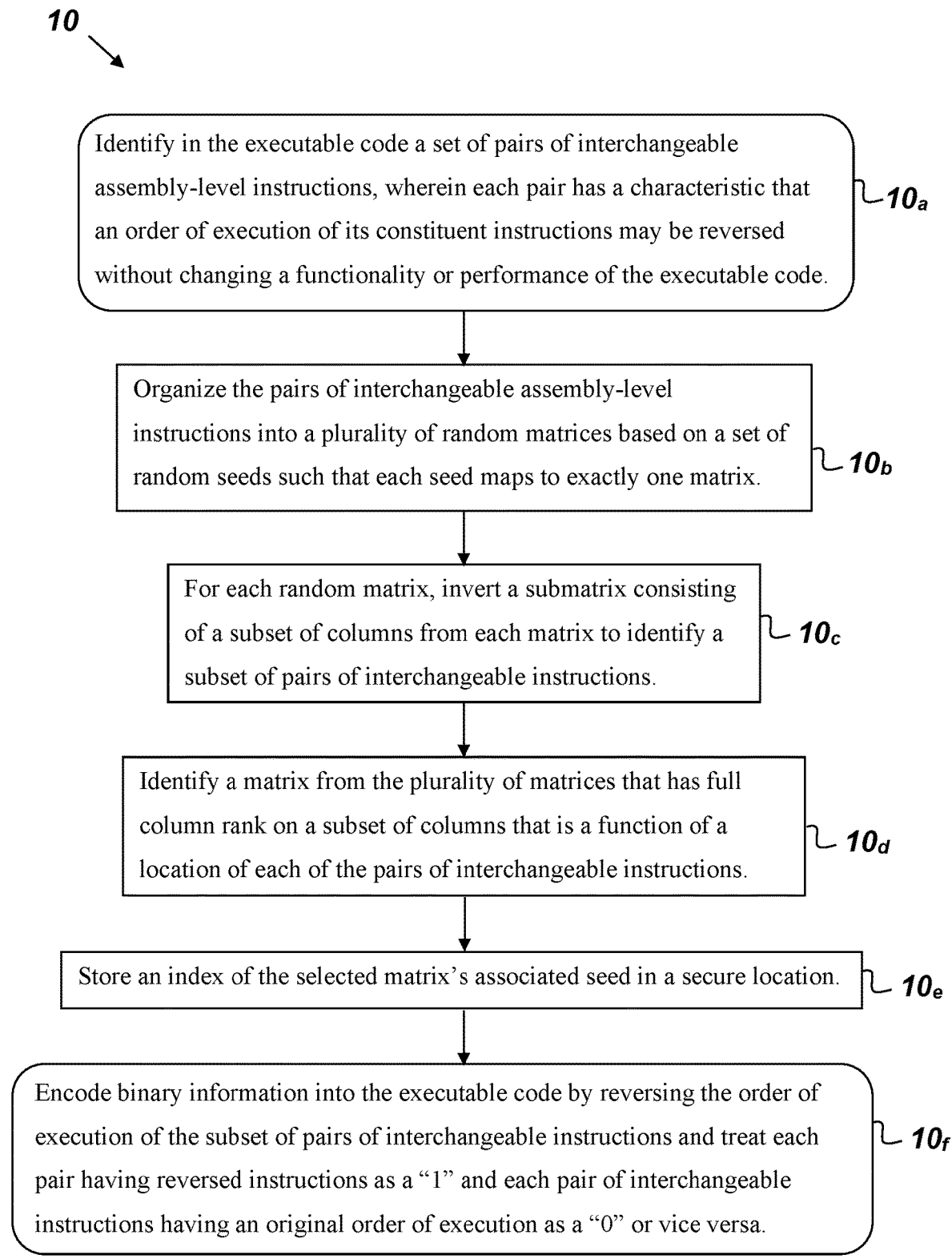
FIG. 1 is a flowchart of a method for using a computer to hide information in executable code.

FIG. 1 is a flowchart of a method 10 for hiding information in software executable code that comprises, consists of, or consists essentially of the following steps. The first step $10_a$ provides for identifying in the executable code a set of pairs of interchangeable assembly-level instructions. Each pair an order of execution that may be reversed without changing a functionality or performance of the executable code. The next step $10_b$ provides for organizing the pairs of interchangeable assembly-level instructions into a plurality of random matrices based on a set of random seeds such that each seed maps to exactly one matrix. The next step $10_c$ provides for inverting, for each random matrix, a submatrix consisting of a subset of columns from each matrix to identify a subset of pairs of interchangeable instructions. The next step $10_d$ provides for identifying a matrix from the plurality of matrices that has full column rank on a subset of columns that is a function of a location of each of the pairs of interchangeable instructions. The next step $10_e$ provides for storing an index of the identified matrix's associated seed in a secure data storage location. The next step $10_f$ provides for encoding binary information into the executable code by reversing the order of execution of the subset of pairs of interchangeable instructions and treating each pair having reversed instructions as a "1" and each pair of interchangeable instructions having an original order of execution as a "0" or vice versa.

Method 10 allows for one to embed a message into the executable code of a software program by swapping a subset of interchangeable instructions. Meta-data can be stored in a secure location which can be used to recover the embedded message. The locations of where instructions are swapped may be represented as binary vectors whose length is equal to the number of instructions in the program. Each position in the vector corresponds to an instruction in the program. More specifically, method 10 provides for the generation of a sequence of matrices such that at least one matrix, known as the encoding matrix, in this sequence has full rank in positions where instructions can be swapped. The encoding may be achieved by inverting the encoding matrix to determine which subset of instructions to swap and then by storing the index of the encoding matrix as meta-data. Given |J| locations where adjacent swaps can be performed, one can embed |J| bits of information. Furthermore, if an encoding algorithm is executed N times, then the expected amount of meta-data required is at most O(log N) bits.

FIGS. 2A and 2B depict example executable code 12 comprising assembly level instructions 14. In the example executable code 12 shown in FIG. 2A, there are two pairs 16 of adjacent instructions 14 whose order of execution can be switched without affecting the functionality or performance of the executable code 12. Two bits of information may be embedded into the program executable code 12 by reversing the order of execution of the two pairs 16, such as is shown in FIG. 2B. Rather than substitute equivalent instruction sequences such as has been done in the prior art, method 10 permutes the execution order of the existing instructions, which makes detection more difficult.

The step of identifying a set of pairs of interchangeable assembly-level instructions is described in detail in the paper, "A Change Would Do You Good: GA-Based Approach for Hiding Data in Program Executables; GECCO'19, Prague, Czech Republic, Jul. 13-17, 2019 by Ryan Gabrys and Luis Martinez (hereinafter referred to as the Paper), which paper is incorporated by reference herein. The traditional approach for determining if two instructions are swappable is to compare the instructions in terms of whether they affect (or could potentially affect) the same memory locations, register contents, or computed values. Generally a formal logic (such as a set of rules dictating how and whether each instruction affects various states in the running computer) would be used and a satisfiability test (SAT) would be performed to determine if swapping the instructions satisfied the constraint that the two instructions do not both alter the same contents of the state of the computer. The formal logic process would be performed via brute force where every pair of adjacent instructions would be tested. In this way, a formal logic approach can determine all instructions which are guaranteed to be safe to swap. This has the benefit of providing an exhaustive list of interchangeable instructions. However, the formal logic approach misses pairs of instructions which can be swapped according to method 10 even though they may not be swapped in other programs. That is, no universal safety guarantee can be made, but the instructions can be swapped anyway. The genetic-algorithm approach, as described in the Paper, can identify such pairs of instructions which can be swapped in spite of violating a rule of the formal semantics of the program/instructions. The genetic-algorithm approach has the benefit of identifying instructions which can be swapped, but would not be easily predicted by an adversary as swappable. While this feature is not required for method 10 to function, it would add an additional layer of obfuscation on top of the operation of the random matrices. Basically, a formal logic approach would identify a subset of the instructions which are actually swappable in practice, resulting in a smaller amount of data than an approach that explores the swapping of pairs of instructions which are not explicitly expected. These two approaches, formal logic driven and random search (as the genetic algorithm performs) can also be combined. First performing exhaustive tests of all pairs of instructions and then only exploring the genetic-algorithm-space of instructions which are not already known to be swappable.

To illustrate an example of the step of identifying a set of pairs of interchangeable assembly-level instructions, suppose $\{i_j, i_k\}$ is a pair of interchangeable instructions where instruction $i_j$ is the j-th instruction in the program and $i_k$ is the k-th instruction in the program. As used herein, the terms "program", "executable program", "executable", and "executable code" are used interchangeably. As a starting point, we restrict our attention to the case where k=j+1 and k is even. Therefore, under this setup, a program with six lines of instruction contains at most three pairs of interchangeable instructions. One straightforward way to embed information into an executable program provided a set of pairs of interchangeable instructions is the following. Suppose $\{i_1, i_2\}$ are two instructions and that $i_1<i_2$ so that $i_1$ is lexicographically smaller than $i_2$. Then, one can embed a single bit of information into this pair of interchangeable instructions by changing the order of $i_1$ and $i_2$. For instance, if $i_1$ appears before $i_2$ in the program we can read this information as a "0" and otherwise if $i_1$ appears after $i_2$ we can read this information as a "1".

In order to decode, one has to know the locations of the pairs of interchangeable instructions. Method 10 does not require foreknowledge of the set of pairs of interchangeable instructions. In summary, method 10 generates a small collection of random matrices where one matrix in this collection is used at a time for the embedding. To enable unique decoding, one simply needs to store the index of the matrix used from this collection during the encoding process. The size of this collection of matrices is small (as discussed further below) so that one can store the index using a small number of additional information bits. For example, assume the executable program consists of 2n instructions. We represent the instruction sequence using a binary vector x of length n. The idea is that every adjacent pair of instructions will be mapped to a bit in x that indicates the order of the instructions in the pair. Let $x=(x_1, \ldots, x_n) \in \{0, 1\}^n$ be the binary vector which corresponds to the first 2n instructions in the executable code. Suppose that $I_j$ represents the j-th line of text in the assembly executable. Formally, we define x so that:

$$x_j = 0 \text{ if } I_{2j} \geq I_{2j-1}, x_j = 1 \text{ else.} \qquad (1)$$

Let $J \subseteq [n]$ be the set of interchangeable pairs of instructions. In particular, if $j \in J$, then it follows that one can swap the instructions $I_{2j}$ and $I_{2j-1}$ without affecting the functionality of the program. The set J is only known to the encoder at the time of encoding and Method 10 works with any set J. Let $\mathbb{F}_2$ denote the Galois Field of size 2. For a matrix $M \in \mathbb{F}_2^{m \times n}$, let $M_J$ be a sub-matrix which is composed of the columns of M indexed by the set J. For example, if $$M = \begin{bmatrix} 0 & 0 & 1 & 1 \\ 0 & 1 & 0 & 1 \end{bmatrix},$$

then $$M_{\{2,4\}} = \begin{bmatrix} 0 & 1 \\ 1 & 1 \end{bmatrix}.$$

An example procedure for encoding is the following. Suppose ones want to encode the information $u \in \mathbb{F}_2^{|J|}$. Let S be a set of random seeds and we suppose that $S = \emptyset$ initially. These seeds can be generated through an encryption library or they can a set of random numbers somewhere in a memory store of a computer. Each seed maps to exactly one matrix that can be used for encoding and decoding. This set of random seeds is known to the computer performing method 10 at the encoding and decoding stages. Here is a summary of the encoding process:

(1) Generate a $|J| \times n$ random matrix M over $\mathbb{F}_2$ using one of the seeds from S.

(2) If $M_J$ does not have full rank, then go back to step (1). If all the seeds in S have been attempted without yielding a matrix M with a submatrix $M_J$ with full rank then randomly generate the matrix M using a new seed s'. Otherwise, if $M_J$ has full rank continue to the next step. The idea behind the encoding is to find a matrix (using the manner described above) such that a subset of its columns have full rank. This is an exhaustive process (although one can show with high probability it won't take an unreasonably long time). (See below discussion of probability.) To find a matrix such that a subset of its columns have full rank one needs to iterate through each of the seeds in the set of random seeds. If one runs through all the seeds and does not find a matrix which meets the requirements, then more random seeds may be generated and added to the collection of seeds.

(3) If $s' \notin S$ and M was generated using s', then add s' to S.

(4) Let $z = M_{[n] \setminus J} \cdot x_{[n] \setminus J} \in \mathbb{F}_2^{|J|}$. Let $\hat{z} = z + u$. Then, let $y = M_J^{-1} \cdot \hat{z} \in \mathbb{F}_2^{|J|}$.

(5) Let $\hat{x}_{[n] \setminus J} = x_{[n] \setminus J}$ and let $\hat{x}_J = y$. One can determine which instructions to swap by performing the above steps. The actual message one intends on encoding into the executable code is represented by the multiplication of matrix M times a vector $\hat{x}$, where $\hat{x}$ is a binary vector whose values are a function of the execution orders of the pairs of all the interchangeable instructions. Once the execution order has been changed, in order to decode the vector v is generated again and the encoded message may be retrieved by multiplying $M \cdot \hat{x}$. If the matrix M has full rank on the column set J, then this is possible (which is why it is desirable to generate a plurality of matrices) by only changing the orders of instructions from the set J.

(6) For every $j \in [n]$ where $x_j \neq \hat{x}_J$ swap the instructions $I_{2j}$ and $I_{2j-1}$.

(7) Store the index of the seed used to generate M During encoding, we choose one of these seeds (which corresponds to exactly one matrix) and the identity of this matrix is then stored by storing the index of the seed (or the lexicographic order) in secure memory. Any type of secure (or encrypted) data storage location would do. Given this information (i.e., the stored index of the seed used to generate M) at decode time, the matrix M can be uniquely regenerated as discussed in more detail below.

An example procedure for decoding follows.

(1) Recover the seed which was used to create the matrix Min step (1) of the encoding algorithm above from the secure location. Next, recover the matrix Musing the seed.

(2) Let x be the vector which represents the first 2n instructions of the assembly executable according to (1).

(3) Recover the vector $\hat{u} = M \cdot x \in \mathbb{F}_2^{|J|}$.

The correctness of the decoding algorithm above may be proved by establishing that the vector $\hat{u}$ satisfies $\hat{u} = u$. This may be done by noting that step (5) of the encoding algorithm above is correct since the matrix $M_J$ by construction has full rank. Furthermore, $M \cdot x = M_J \cdot y + M_{[n] \setminus J} \cdot x_{[n] \setminus J} = \hat{z} + z = (z+u) + z = u$.

Next, we turn to proving the efficiency of method 10. In particular, we bound the number of times the encoding algorithm executes step (1) and show that the probability that step (1) of the encoding algorithm is executed more than T times is $(3/4)^T$. It can be shown that the probability that a $|J| \times |J|$ matrix has full rank is:

$$\Pi_{j=1}^{|J|}(1-2^{-j}) > 1/2 \cdot (1 - \Sigma_{j=2}^{\infty} 2^{-j}) = 1/4 \qquad (2)$$

This implies that the probability a random matrix does not have full rank is at most 3/4. Since the event that the matrix $M_J$ has full rank at each iteration i is independent of the event that the matrix $M_J$ has full rank at iteration i+1, the result follows.

Figure 3:
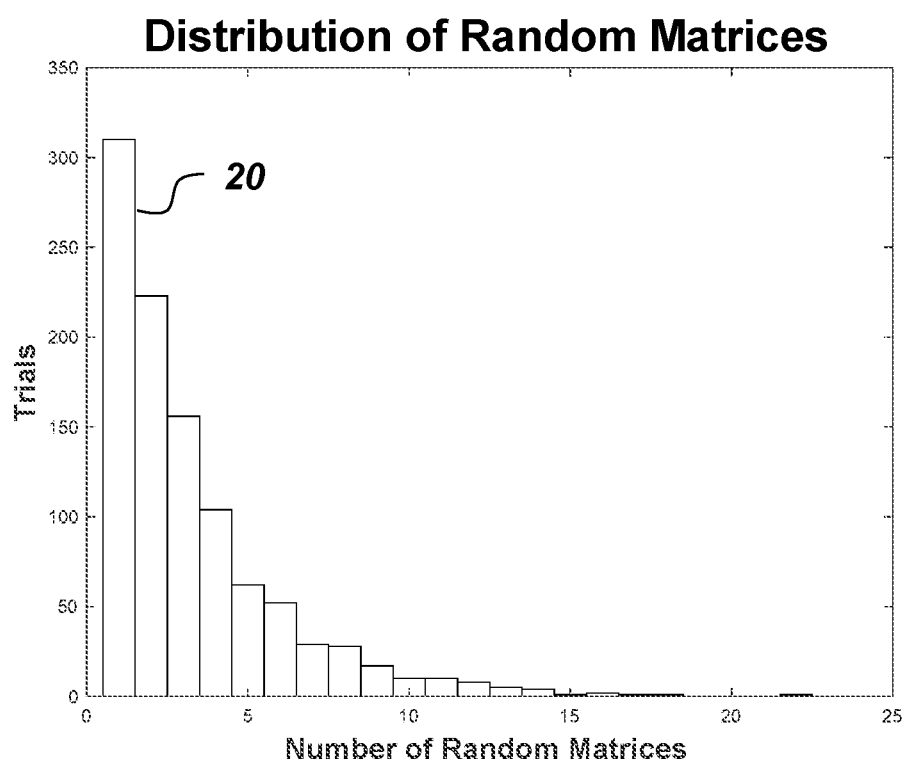
FIG. 3 is a histogram of a distribution of random matrices.

FIG. 3 is a histogram of a distribution of random matrices based on the performance of the decoding algorithm by running $2^{10}$ trials where at each trial, we kept generating random binary matrices of dimensions 100×100 until we arrived at one which was full rank. The results of these trials are displayed in FIG. 3, in which it is noteworthy that most of the time only one or two random matrices had to be generated before arriving at one which was full rank. In fact, the first bar 20 shown in FIG. 3 implies that in over 300 of the 1024 trials, only a single random matrix had to be generated so that this initial random matrix had full rank. Our simulations required that $|S| = 22$ under the setup used to generate FIG. 3. However, it is to be understood that other values of the set S of random seeds may also be used. For example, a size of ten for the set S of random seeds would be suitable for the purposes of method 10.

The hidden binary information may be a digital signature such that retrieval of the digital signature would serve as both a validation that the executable code is authentic and also that the executable code has not been tampered with. Due to the way method 10 hides the information in the executable code, the introduction of any new code or the removal of existing code would corrupt the hidden message. Method 10 does not require the introduction of new instructions, which may be detectable. Furthermore, method 10 does not require storing the locations of where changes in the program executable are made.

Method 10 has the advantage that its steps may be employed to hide data in any program executable even if the source code of the program executable is not available. In other words, method 10 can be used to insert hidden information into precompiled binary code without access to the source code. In one embodiment of the method 10, an additional step provides for compiling a program using a "randomized multicompiler" or a "diversifying compiler." Such compiler technologies increase the number of variants of a single program, increase available instructions within a program, and can flatten the overall statistics for various program instructions. Another positive feature of method 10 is that it can be applied to programs that reside on disk, during program compilation, during program loading, or after the program is stored in computer memory. Extracting and checking embedded information which is encoded according to the steps of method 10 can take the place or augment traditional program integrity checking methods, such as the use of a message digest hash.

From the above description of the method 10 for hiding information in executable code, it is manifest that various techniques may be used for implementing the concepts of method 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that method 10 is not limited to the particular embodiments described herein, but is capable of many embodiments without departing from the scope of the claims.

We claim:

1. A method for using a computer to hide information in executable code comprising:

identifying in the executable code a set of pairs of interchangeable assembly-level instructions, wherein each pair has a characteristic that an order of execution of its constituent instructions may be reversed without changing a functionality or performance of the executable code;

organizing the pairs of interchangeable assembly-level instructions into a plurality of random matrices based on a set of random seeds such that each seed maps to exactly one matrix;

for each random matrix, inverting a submatrix consisting of a subset of columns from each matrix to identify a subset of pairs of interchangeable instructions;

identifying a matrix from the plurality of matrices that has full column rank on a subset of columns that is a function of a location of each of the pairs of interchangeable instructions;

storing an index of the identified matrix's associated seed in a secure data storage location; and encoding binary information into the executable code by reversing the order of execution of the subset of pairs of interchangeable instructions and treating each pair having reversed instructions as a "1" and each pair of interchangeable instructions having an original order of execution as a "0" or vice versa.

2. The method of claim 1, further comprising:

recovering the index of the identified matrix's associated seed from the secure data storage location; and reconstructing the identified matrix and its corresponding submatrix based on the associated seed in order to identify which pairs of instructions have been reversed and thus retrieve the encoded binary information.

3. The method of claim 2, wherein the steps of claim 2 are performed by a second, separate computer from the computer identified in claim 1.

4. A method for using a computer to hide information in executable code comprising:

a. identifying in the executable code a set J of pairs of interchangeable assembly-level instructions, wherein each pair has an order of execution of its constituent instructions that may be reversed without changing a functionality or performance of the executable code;

b. generating a $|J| \times n$ matrix M over a finite field of size two based on one of a set S of random seeds, wherein n is a total number of interchangeable assembly-level instructions;

c. creating a sub-matrix $M_J$ composed of a subset of columns of the matrix M indexed by the set J to identify a subset of pairs of interchangeable instructions;

d. repeating steps (b)-(c) with different seeds until the sub-matrix $M_J$ has full rank;

e. encoding hidden binary information into the executable code by reversing the order of execution of the subset of the pairs of interchangeable assembly-level instructions whereby each of the subset of pairs with a reversed order of execution is deemed a "1" and each pair of assembly-level instructions that maintains an original order of execution is deemed a "0" such that the functionality of the executable code is not altered;

f. storing in a secure location an index of a seed associated with the full-rank sub-matrix $M_J$; and g. retrieving the hidden binary information by recovering the index of the seed associated with the full-rank sub-matrix $M_J$ from the secure location and regenerating the matrix M based on the seed associated with the full-rank sub-matrix $M_J$.

5. The method of claim 4, further comprising using a new seed s' to randomly generate the matrix M if all the seeds in set S have been used to create matrices and none of the associated submatrices $M_J$ are full rank.

6. The method of claim 5, further comprising adding s' to S if s'<S and the matrix M was generated using s'.

7. The method of claim 6, wherein the set S is the set of random seeds after the algorithm has been executed.

8. The method of claim 4, where step (g) is performed without a foreknowledge of which subset of pairs have a reversed order of execution.

9. The method of claim 4, wherein each of the pairs of interchangeable assembly-level instructions consist of two adjacent instructions in the executable code.

10. The method of claim 4, wherein the hidden binary information is a digital signature such that retrieval of the digital signature would serve as both a validation that the executable code is authentic and also that the executable code has not been tampered with.

11. The method of claim 4, wherein the set of random seeds is generated through an encryption library.

12. The method of claim 4, wherein the set of random seeds is stored in a memory store.

13. The method of claim 4, wherein the subset of instructions with reversed order of execution is not pre-determined before the encoding steps.

14. The method of claim 4, wherein the method does not include introduction of new instructions in the executable code.

\* \* \* \* \*